United States Patent [19]
Motoyama et al.

[11] Patent Number: 5,690,063
[45] Date of Patent: Nov. 25, 1997

[54] ENGINE CONTROL SYSTEM

[75] Inventors: Yu Motoyama; Takeru Ibara, both of Iwata, Japan

[73] Assignee: Yamaha Hatsudoki Kabushiki Kaisha, Iwata, Japan

[21] Appl. No.: 679,292

[22] Filed: Jul. 12, 1996

[30] Foreign Application Priority Data

Jul. 18, 1995 [JP] Japan .................................. 7-203910

[51] Int. Cl.$^6$ .............................. F02D 17/00; F02D 41/26
[52] U.S. Cl. ........................ 123/73 A; 123/73 B
[58] Field of Search ..................... 123/73 A, 73 B, 123/73 C

[56] References Cited

U.S. PATENT DOCUMENTS

| | | | |
|---|---|---|---|
| 4,955,341 | 9/1990 | Trombley et al. | 123/73 C |
| 4,989,554 | 2/1991 | Kushida et al. | 123/73 A |
| 5,020,484 | 6/1991 | Ishikawa et al. | 123/196 R |
| 5,050,551 | 9/1991 | Morikawa | 123/73 C |
| 5,085,193 | 2/1992 | Morikawa | 123/73 C |
| 5,140,964 | 8/1992 | Torigai | 123/73 A |
| 5,170,760 | 12/1992 | Yamada et al. | 123/73 C |
| 5,174,261 | 12/1992 | Fujii et al. | 123/73 A |
| 5,191,531 | 3/1993 | Kurosu et al. | 123/73 C |
| 5,207,190 | 5/1993 | Torigai et al. | 123/73 A |
| 5,231,958 | 8/1993 | Takahashi et al. | 123/73 A |
| 5,333,583 | 8/1994 | Matsuura | 123/73 C |
| 5,441,030 | 8/1995 | Satsukawa | 123/73 A |
| 5,522,362 | 6/1996 | Motose | 123/73 A |

FOREIGN PATENT DOCUMENTS 4-31658  5/1990  Japan ........................ 123/73 C

*Primary Examiner*—David A. Okonsky
*Attorney, Agent, or Firm*—Knobbe, Martens, Olson & Bear LLP

[57] ABSTRACT

A fuel injection and ignition control system for a two-cycle crankcase compression engine wherein both fuel injection and ignition timing are controlled by sensed engine running characteristics at a predetermined crankshaft position. The timing of the ignition is controlled by the same parameter at which the fuel injection was controlled, so that the timing of ignition and amount and duration of fuel injection will be optimized for the same engine running condition.

20 Claims, 3 Drawing Sheets

*Figure 1*

ENGINE CONTROL SYSTEM

BACKGROUND OF THE INVENTION

This invention relates to an engine control system and more particularly to an improved engine control system and method for a two-cycle, crankcase compression, internal compression engine.

In the interest of improving the performance of internal combustion engines, very sophisticated control techniques have been employed. The utilization of fuel injection is an instrumental feature in obtaining the maximum utilization of these control techniques. Fuel injectors permit accurate control of the amount of fuel delivered to the engine on each of its cycles. That is, a fuel injector can operate so as to vary the amount of fuel supplied to a combustion chamber from one cycle to the next. Obviously, this degree of control is not possible with carbureted engines.

The application of such sophisticated controls to four-cycle engines is relatively easy to implement. This is because the individual cycles (intake, compression, expansion, and exhaust) occur during successive strokes of the piston, and there is substantially no overlap therebetween. With a two-cycle engine, on the other hand, the problem is much more complicated. Although it is possible to obtain cylinder-to-cylinder control if direct cylinder injection is employed, there are a number of reasons why direct cylinder injection may not be suitable for two-cycle engines.

One of the main problems with direct cylinder fuel injection with two-cycle engines is that the time interval between fuel injection and ignition is relatively short in a two-cycle direct injected engine. As a result, there are problems in conjunction with ensuring adequate vaporization of the fuel and total combustion.

Another reason why direct cylinder injection is not always feasible with two-cycle engines is also related to the fuel vaporization. If the fuel is injected into the engine in a way that the fuel passes through the crankcase chamber, then two advantages result. The first of these is that the fuel vaporization before combustion is initiated can progress much further. Furthermore, the vaporization of the fuel in the crankcase chamber assists in cooling the piston and particularly the underside thereof. Therefore, there are a number of advantages of employing fuel injection with two-cycle crankcase compression engines wherein the fuel injection takes place in the crankcase chamber or at least upstream of the combustion chamber.

It is, therefore, a principal object of this invention to provide an improved control system and method for a two-cycle crankcase compression fuel injected engine.

It is a further object of this invention to provide an improved method and control system for a fuel injected engine that lends itself to application to two-cycle engines.

SUMMARY OF THE INVENTION

This invention is adapted to be embodied in a system and control method for a two-cycle crankcase compression internal combustion engine. The engine has a cylinder block which defines a cylinder bore that is closed at one end by a cylinder head to form a combustion chamber and at the other end by a crankcase member that forms a crankcase chamber. A crankshaft is rotatably journaled in the crankcase chamber. A piston in the cylinder bore is operatively connected to the crankshaft for driving the crankshaft. An air induction system is provided for delivering an air supply to the crankcase chamber for compression therein. A scavenge passage arrangement is provided for transferring the charge compressed in the crankcase chamber to the combustion chamber for further compression therein. A spark plug is mounted in the engine and has its gap extending into the combustion chamber for firing the charge therein. An exhaust system is provided for discharging the exhaust products from the combustion chamber. The engine also includes a sensor arrangement for sensing at least one running condition of the engine.

In accordance with an engine operated in accordance with a system embodying the invention, the amount and timing of the fuel injection is controlled by the output of the engine condition sensor arrangement. The timing of firing of the spark plug is controlled on a portion of the cycle that succeeds the intake cycle so that the amount of fuel injected and the spark timing coincide with the sensed engine condition.

In accordance with a method for practicing the invention, the timing and duration of fuel injection during an intake cycle is determined by the sensed condition of the engine at a time during that cycle. The timing for subsequent firing of the spark plug is also controlled in response to the same sensed condition so fuel injected and the timing of ignition are set for the same condition.

BRIEF DESCRIPTION OF THE DRAWINGS

FIG. 1 is a partially schematic cross-sectional view taken through a single cylinder of an internal combustion engine constructed and operated in accordance with an embodiment of the invention.

DETAILED DESCRIPTION OF THE PREFERRED EMBODIMENTS OF THE INVENTION

Figure 1:
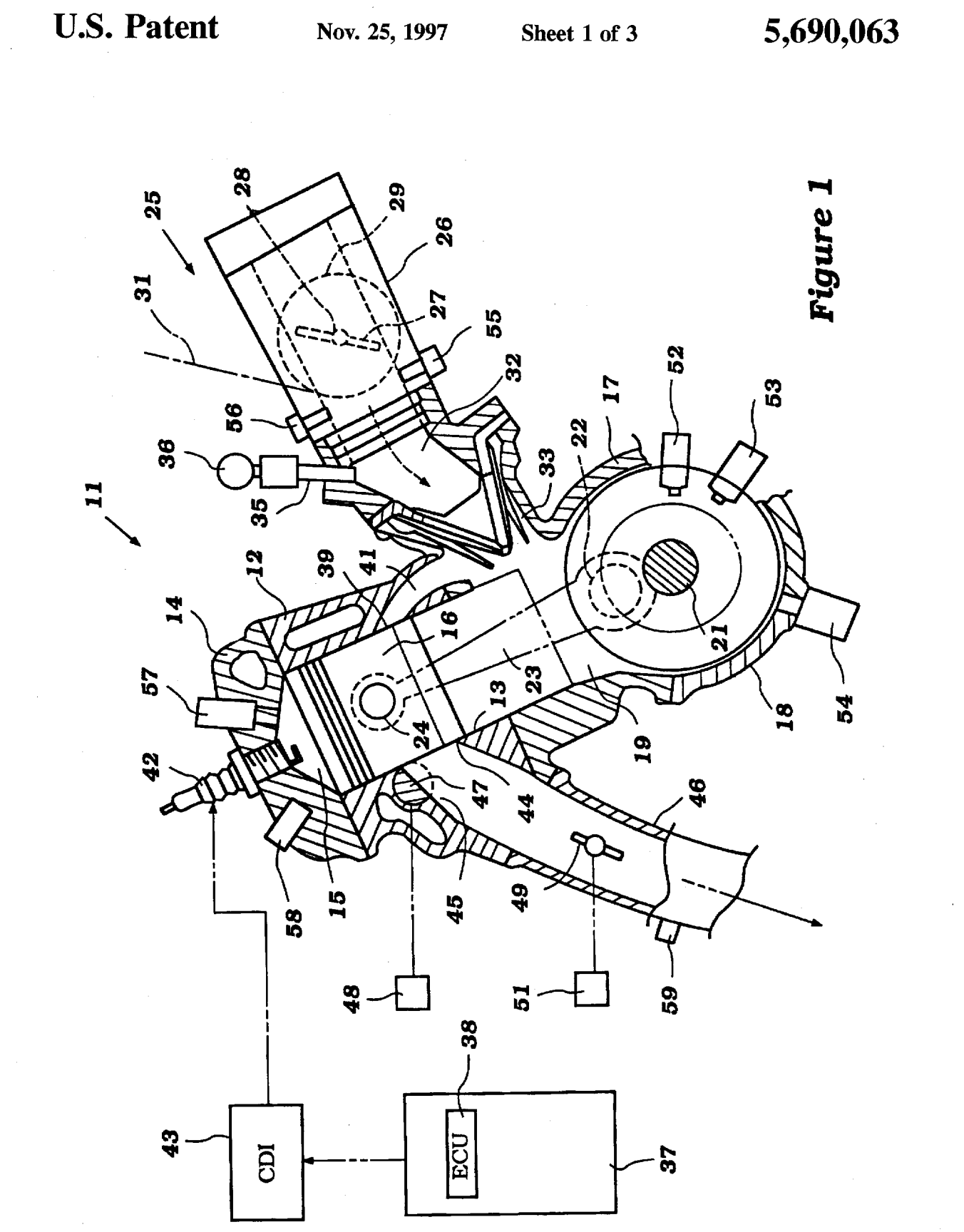
Figure 2:
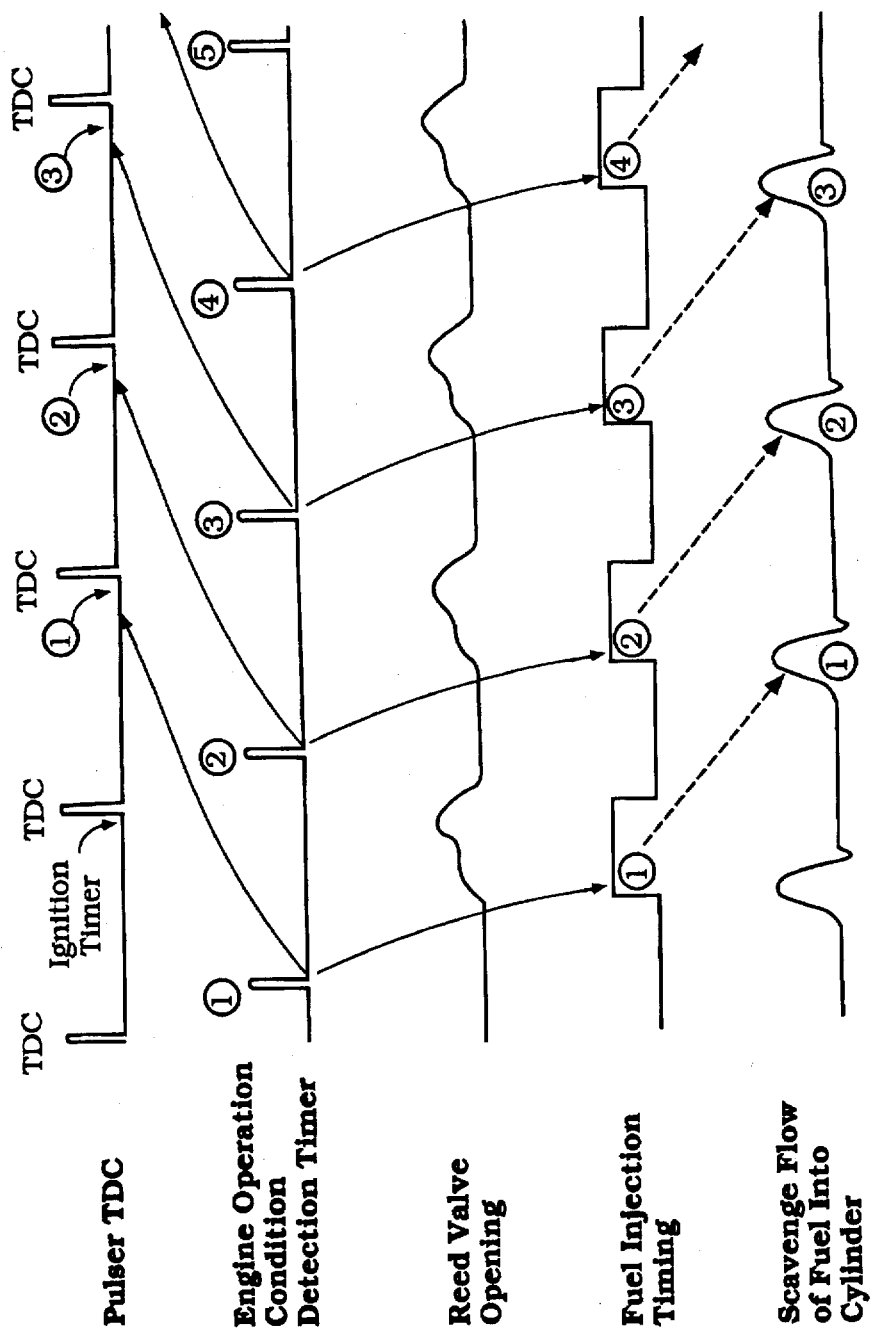
FIG. 2 is a timing diagram showing the output of the top dead center condition sensor, the timing of sensing of engine operating conditions, the reed valve opening, fuel injection timing and scavenge delivery of fuel into the cylinder all during a period of successive cycles to describe an embodiment and operating condition of the invention.

Referring now in detail to the drawings and initially to FIG. 1, an internal combustion engine constructed and operated in accordance with an embodiment of the engine is indicated generally by the reference numeral 11. The invention deals primarily with the control system and method of operating the engine 11, and for that reason, the basic description of the structure of the invention 11 will be limited primarily to a description of what is illustrated in the cross-sectional view.

In this view, a single cylinder of the engine is depicted, and it will be readily apparent to those skilled in the art that the invention is not limited to the configuration of the engine 11 as depicted. That is, the invention may be utilized with a wide variety of types and configurations of engines, including in-line, V-type, opposed, single-cylinder or multiple-cylinder engines. The invention is, however, particularly adapted for use with two-cycle engines, and the engine 11, as depicted, is of this type and operates on a crankcase compression principle. For reasons which will become apparent, the invention is particularly adapted for utilization with such engines.

For the reasons aforenoted, the structure of the engine 11 which will be described should be considered to be only exemplary. In addition, since the invention deals primarily with the control structure and methodology, not all of the details of the engine 11 are illustrated, nor will all the details be described. Where any details are not shown or described, they may be considered to be conventional or of any known type.

In the illustrated embodiment, the engine 11 is adapted to power a motor vehicle such as a motorcycle. Again, however, it will be readily apparent to those skilled in the art how the invention can be utilized in conjunction with any of the wide variety of applications for internal combustion engines. The powering of motor vehicles, however, is a particularly important area where the invention may be utilized.

The engine 11 is comprised of a cylinder block 12 that is formed with one or more cylinder bores 13, as already noted. A cylinder head assembly 14 is affixed to the cylinder block 12 at one end thereof and in closing relationship with the cylinder bore 13. The cylinder head 14 is formed with a recess 15 which cooperates with the cylinder bore 13 and the head of a piston 16 that reciprocates therein to form a variable-volume combustion chamber. Since at top dead center position, as shown in FIG. 1, the bulk of the volume of the combustion chamber is formed by the cylinder head recess 15, at times the recess 15 will be referred to as the combustion chamber.

The cylinder block 12 has a skirt portion 17 formed at the other end of the cylinder bore 13 and which closes this cylinder bore end. The skirt member 17 has affixed to it a crankcase member 18 so as to form a crankcase chamber 19. If the engine 11 is of the multiple-cylinder type, the crankcase chambers 19 associated with each of the cylinder bores 13 will be sealed from each other in a known manner.

A crankshaft 21 is rotatably journaled within this crankcase chamber 19 in a known manner. The crankshaft 21 has throws 22 on which the big ends of connecting rods 23 are journaled. The small ends of the connecting rods 23 are connected to the pistons 16 by piston pins 24 so as to effect a driving connection between the pistons 16 and the crankshaft 21.

An induction system, indicated generally by the reference numeral 25, is provided for delivering an air charge to the crankcase chambers 19. This induction system includes an air inlet device (not shown) that collects atmospheric air and delivers it to a throttle body 26. The throttle body 26 has journaled within it a butterfly-type throttle valve 27 for control of the air flow to the engine 11 and, accordingly, its speed.

The throttle valve 27 is affixed to a throttle valve shaft 28 which has a pulley 29 affixed to one end which extends outwardly beyond the throttle body 26. A wire actuator 31 is connected to the pulley 29 at one end and to a remote operator control (not shown) at another end for operator control of the throttle valve 27 in a manner well known in this art.

The throttle bodies 26 are connected to an intake manifold 32, which, in turn, communicates with intake ports 33 formed in the cylinder block skirt 17 and which communicate with the crankcase chambers 19. Reed-type check valve assemblies 34 are disposed in these intake ports 33 so as to permit an air charge to enter the crankcase chambers 19, as shown by the broken arrow in FIG. 1, when the pistons 16 are moving from their bottom dead center position, as shown in phantom in this figure, toward their top dead center position. This latter TDC position is shown in solid lines, as already noted. When the pistons 16 move downwardly to begin to compress the charge in the crankcase chambers 19, the reed-type valves of the valve assembly 34 will close to preclude reverse flow.

Fuel is also mixed with the inducted air. To this end, a fuel injector 35 is mounted in each manifold runner 32 and is disposed so that its spray axis is directed toward the reed-type valve assembly 34. The fuel injectors 35 are supplied with fuel under pressure through a fuel supply system that includes a fuel rail 36. Like many other features of the invention, the actual construction of the fuel injection system may be of any type known in the art. For that reason, it will not be described further.

However, the fuel injectors 35 are preferably of the electronically operated type and employ an injection valve (not shown) that is opened under the operation of an electrically operated solenoid. Obviously, other types of fuel injectors may be employed.

The fuel injector 35 is controlled by a control module, indicated generally by the reference numeral 37 and shown schematically. This control module includes an ECU 38, which operates in a manner which will be described, so as to control both the timing and duration of fuel injection.

The fuel-air charge which has then been introduced into the crankcase chambers 19 and which is compressed in the manner aforedescribed is then transferred to the combustion chambers when the piston 16 moves downwardly to open one or more scavenge ports 39. The scavenge ports 39 are formed at the termination of scavenge passages 41 which extend from the crankcase chambers 19 to the respective scavenge ports 39. This charge induction begins when the pistons 16 move downwardly toward their bottom dead center (BDC) position sufficiently so as to open the scavenge ports 39, and continues until the pistons 16 pass their bottom dead center position and move sufficiently toward their TDC position to again close the scavenge ports 39.

The resulting charge is then further compressed in the combustion chambers 15. A spark plug 42 is mounted in the cylinder head 14 for each recess 15. The spark plugs 42 are fired by an appropriate ignition system, such as a CDI system (capacitor discharge ignition system), shown schematically at 43, and which is also controlled by the controller 37, and specifically its ECU 38. The control strategy for firing the spark plugs 42 also forms an important portion of the invention and will be described later.

When the charge in the combustion chamber 15 is ignited, it will burn, expand, and drive the piston 15 downwardly. Eventually, the piston 16 will uncover an exhaust port 44 formed in the cylinder bore 13, and which communicates with an exhaust passage 45 formed therein. This exhaust passage 45, in turn, discharges the exhaust gases to an exhaust manifold 46 for eventual discharge to the atmosphere through an appropriate exhaust system.

An exhaust port control valve 47 of a known type is mounted in the cylinder block 12 adjacent the exhaust port 44. This exhaust port control valve 47 is controlled by a servomotor 48 in accordance with a suitable control strategy so as to vary the effective compression ratio of the engine, as is also well known in this art. This is done by changing the timing of opening and closing of the exhaust port 44 and is done so as to optimize engine performance.

To further enhance engine performance, a control valve 49 may be placed in the exhaust manifold 46 for controlling the back pressure in the exhaust passage 45 and the scavenging effect. A further servomotor 51, also controlled by the controller 37, operates in accordance with any known type of control strategy for positioning the exhaust pressure control valve 49.

Reference has been made to the various engine controls, including the control for the fuel injector 35, the capacitor discharge ignition 43 for the spark plug 42, the exhaust port control valve 47, and the exhaust pressure control valve 49. These and other engine controls may be managed by the controller 37.

To this end, the controller 37 is supplied with certain data regarding engine running and ambient conditions. Certain sensors, some of which will be described, are employed for this purpose. These include a pulser coil 52 that is associated with the crankshaft 21 and which outputs a signal at a predetermined crankshaft angle, most preferably top dead center condition. In addition, a crank angle sensor 53 is provided, which can cooperate with gear teeth on the flywheel associated with the crankshaft 21 so as to output individual signals indicative of crank angle. One of the sensors, preferably the sensor 52, also can provide an engine speed signal by summing the number of pulses in a given time period, as is well known in this art.

Engine air flow may be measured in a wide variety of fashions, and one way this can be done is by utilizing a crankcase pressure sensor 54. By taking pressure sensor signals at certain crank angles, the actual air flow to the engine can be accurately measured. Also, an engine load or demand signal may be supplied by a sensor that indicates either the position of the throttle valve 27 or the position of the operator which controls it.

Induction system pressure is measured by a pressure sensor 55 that is disposed in the throttle body 26 downstream of the throttle valve 27. In a like manner, intake air temperature may be sensed by a similarly positioned temperature sensor 56.

In-cylinder pressure is measured by a pressure sensor 57 that is mounted in the cylinder head 14 and which senses the combustion chamber pressure. Also, a knock sensor 58 may be mounted in the cylinder head 14 or cylinder block 12 to provide indications of engine vibrations that are indicative of knocking or incipient knocking conditions.

An engine exhaust temperature sensor 59 is mounted in the exhaust manifold 46 and senses the temperature of the exhaust gases. As has been noted, the sensors described are exemplary only and those skilled in the art will readily understand how these signals or other signals may be utilized to provide engine management control. The invention deals not primarily with the parameters utilized in the control strategy, but rather the timing of the sensing of the conditions and the adjustment of the fuel injection timing and amount and spark timing in relation to that factor and in relation to the actual crank angle.

This strategy will now be described first by reference to FIG. 2, which shows one embodiment which may be primarily for the low-speed and mid-range conditions, but may also be utilized under all running conditions. As may be seen, the pulser coil 52 outputs a pulse each time the piston 16 reaches its top dead center position. At certain time intervals, such as shortly after this top dead center position, an engine operating condition detecting timer collects certain data from some of the sensors noted. Preferably, these would be at least the conditions of engine speed and load, although, as has been noted, other conditions may be employed.

Continuing to move down from the top of FIG. 2, it will be readily apparent that the reed-type valves 34 will be closed during a portion of the piston travel. However, as the pistons 16 move upwardly from their bottom dead center positions, a pressure difference will be created across the reed-type valves 34 that will eventually cause them to open. The opening pattern, as can be seen, continues on when the piston approaches its top dead center position. Because of the inertial effects on air flow, the reed-type valves 34 will not actually close until after the pistons move downwardly toward bottom dead center.

Continuing to progress toward the bottom of FIG. 2, the fuel injection timing is controlled so as to begin sometime after the reed-type valves open and continue on until a time before the scavenge ports are opened in the piston's downward travel. However, the charge which is now flowing into the crankcase chamber 19 will be a fresh charge which will not be transferred to the combustion chamber 15 until after this time. Thus, in accordance with an important feature of the invention, the injection timing and duration is set after the engine conditions are measured at some point after top dead center for what will amount to be the next succeeding cycle of engine operation. This relationship may be seen in FIG. 1 in that the charge which is being admitted to the crankcase chamber and which is controlled at the time period (1) will not be transferred into the combustion chamber until after the charge previously transmitted has been burned by firing of the spark plug 42 at some time after the condition is sensed and before the piston again reaches top dead center.

However, rather than setting the ignition timing then based upon the crank angle and conditions previously, the spark timing for the firing of the spark plug 42 will be also delayed until the charge which has been previously controlled in volume and time is transferred to the combustion chamber. Thus, the time of spark ignition is set so as to be based upon the same characteristics for those user to control the charge which is being burned. This necessitates a delay by one cycle from the time when the actual injection occurred in relation to top dead center condition. Thus, combustion is much better controlled because the timing for burning of the charge is set based on the same parameters as the amount of fuel.

Figure 3:
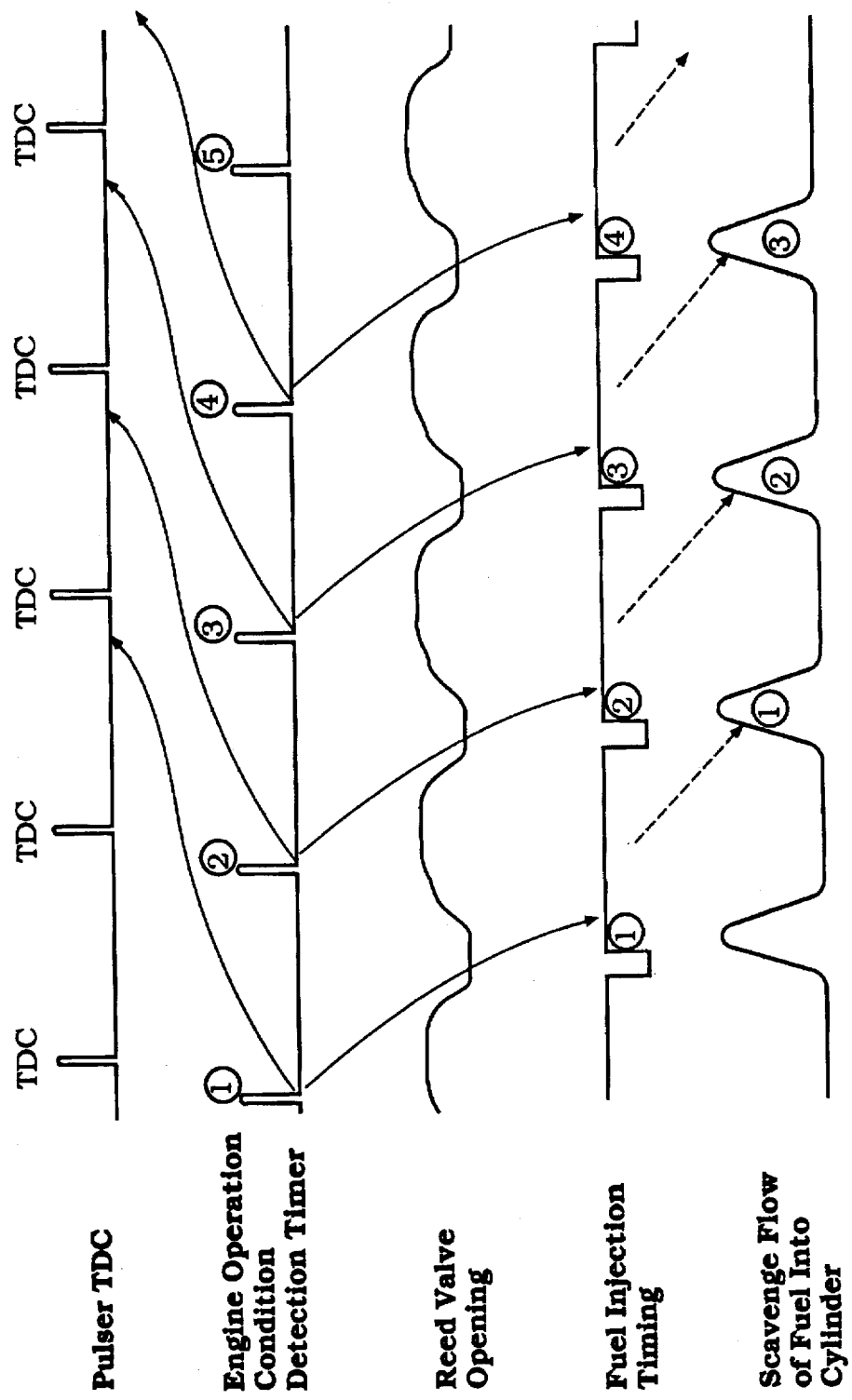
FIG. 3 is a graphical timing diagram, in part similar to FIG. 2, showing the same parameters, but during a different engine running condition and operating cycle.

FIG. 3 shows how this system can operate under high-speed, high-load conditions. This is done by moving the sensing time forward before top dead center from the cycle previous to that used in the embodiment of FIG. 2. This arrangement may be used under all running conditions, but it is more preferable to use it under high-speed, high-load engine running conditions. Said another way, the timing of determining when the engine conditions are read can be changed, depending upon speed and load between the timing shown in FIG. 2 and the timing shown in FIG. 3. In each instance the fuel injection timing is controlled for the next cycle of fuel injection from when the conditions are detected, and the spark ignition is always set by a timing which follows the timing of fuel injection initiation by at least one cycle of operation.

It should be readily apparent that the foregoing description is that of preferred embodiments of the invention, and that various changes and modifications may be made without departing from the spirit and scope of the invention, as defined by the appended claims.

What is claimed is:

1. A two-cycle, crankcase compression, internal combustion engine comprised of a cylinder block having a cylinder bore closed at one end to form a combustion chamber and closed at the other end to form a crankcase chamber, a piston reciprocating in said cylinder bore, a crankshaft rotatably journaled within said crankcase chamber and driven by said piston, an induction system for admitting an air charge into said crankcase chamber, scavenge passage means for communicating said crankcase chamber with said combustion chamber for transmitting a charge thereto, a spark plug for firing a charge in said combustion chamber, an exhaust system for discharging a burnt charge from said combustion chamber, a fuel injector for injecting fuel into the air charge that is transferred into said combustion chamber through said scavenge passage, means for sensing at least one engine running condition, and control means for controlling the timing and duration of the injection of fuel from said fuel injector from said sensed engine running condition and for controlling the initiation of firing of said spark plug during the succeeding cycle of engine operation when the controlled charge enters the combustion chamber through the scavenge passage means from said sensed engine running condition.

2. A two-cycle, crankcase compression, internal combustion engine as defined in claim 1, further including check valve means in the induction system for controlling the flow of air charge into the crankcase chamber.

3. A two-cycle, crankcase compression, internal combustion engine as defined in claim 1, wherein the fuel injector injects fuel into the air flow flowing through the induction passage upstream of the crankcase chamber.

4. A two-cycle, crankcase compression, internal combustion engine as defined in claim 3, further including check valve means in said induction system for controlling the flow of air charge into the crankcase chamber.

5. A two-cycle, crankcase compression, internal combustion engine as defined in claim 4, wherein the fuel injector injects fuel upstream of the check valve.

6. A two-cycle, crankcase compression, internal combustion engine as defined in claim 1, wherein the fuel injection is initiated so as to be completed before the scavenge passage is opened during the cycle when the fuel will be transferred to the combustion chamber.

7. A two-cycle, crankcase compression, internal combustion engine as defined in claim 6, further including check valve means in the induction system for controlling the flow of air charge into the crankcase chamber.

8. A two-cycle, crankcase compression, internal combustion engine as defined in claim 6, wherein the fuel injector injects fuel into the air flow flowing through the induction passage upstream of the crankcase chamber.

9. A two-cycle, crankcase compression, internal combustion engine as defined in claim 8, further including check valve means in said induction system for controlling the flow of air charge into the crankcase chamber.

10. A two-cycle, crankcase compression, internal combustion engine as defined in claim 9, wherein the fuel injector injects fuel upstream of the check valve.

11. A method of operating a two-cycle, crankcase compression, internal combustion engine comprised of a cylinder block having a cylinder bore closed at one end to form a combustion chamber and closed at the other end to form a crankcase chamber, a piston reciprocating in said cylinder bore, a crankshaft rotatably journaled within said crankcase chamber and driven by said piston, an induction system for admitting an air charge into said crankcase chamber, scavenge passage means for communicating said crankcase chamber with said combustion chamber for transmitting a charge thereto, a spark plug for firing a charge in said combustion chamber, an exhaust system for discharging a burnt charge from said combustion chamber, a fuel injector for injecting fuel into the air charge that is transferred into said combustion chamber through said scavenge passage, said method comprising the steps of sensing at least one engine running condition, controlling the timing and duration of the injection of fuel from said fuel injector from said sensed engine running condition and controlling the initiation of firing of said spark plug during the succeeding cycle of engine operation when the controlled charge enters the combustion chamber through the scavenge passage means from said sensed engine running condition.

12. A method of operating a two-cycle, crankcase compression, internal combustion engine as defined in claim 1, further including providing check valve means in the induction system for controlling the flow of air charge into the crankcase chamber.

13. A method of operating a two-cycle, crankcase compression, internal combustion engine as defined in claim 1, wherein the fuel injector injects fuel into the air flow flowing through the induction passage upstream of the crankcase chamber.

14. A method of operating a two-cycle, crankcase compression, internal combustion engine as defined in claim 3, further including providing check valve means in said induction system for controlling the flow of air charge into the crankcase chamber.

15. A method of operating a two-cycle, crankcase compression, internal combustion engine as defined in claim 4, wherein the fuel injector injects fuel upstream of the check valve.

16. A method of operating a two-cycle, crankcase compression, internal combustion engine as defined in claim 1, wherein the fuel injection is initiated so as to be completed before the scavenge passage is opened during the cycle when the fuel will be transferred to the combustion chamber.

17. A two-cycle, crankcase compression, internal combustion engine as defined in claim 6, further including providing check valve means in the induction system for controlling the flow of air charge into the crankcase chamber.

18. A two-cycle, crankcase compression, internal combustion engine as defined in claim 6, wherein the fuel injector injects fuel into the air flow flowing through the induction passage upstream of the crankcase chamber.

19. A method of operating a two-cycle, crankcase compression, internal combustion engine as defined in claim 8, further including providing check valve means in said induction system for controlling the flow of air charge into the crankcase chamber.

20. A method of operating a two-cycle, crankcase compression, internal combustion engine as defined in claim 9, wherein the fuel injector injects fuel upstream of the check valve.

* * * * *